US008403181B2

(12) United States Patent
Ding

(10) Patent No.: US 8,403,181 B2
(45) Date of Patent: Mar. 26, 2013

(54) WATER-INGRESS-PREVENTING MECHANISM FOR LOTION PUMP

(76) Inventor: Yaowu Ding, Taixing (CN)

( * ) Notice: Subject to any disclaimer, the term of this patent is extended or adjusted under 35 U.S.C. 154(b) by 489 days.

(21) Appl. No.: 12/522,689

(22) PCT Filed: Feb. 8, 2007

(86) PCT No.: PCT/CN2007/000429

§ 371 (c)(1), (2), (4) Date: Jul. 9, 2009

(87) PCT Pub. No.: WO2008/098405

PCT Pub. Date: Aug. 21, 2008

(65) Prior Publication Data

US 2009/0314805 A1 Dec. 24, 2009

(51) Int. Cl.
*B67B 1/00* (2006.01)
*G01F 11/00* (2006.01)
*B05B 11/00* (2006.01)

(52) U.S. Cl. ............. 222/153.13; 222/321.2; 222/321.9; 222/384

(58) Field of Classification Search ............. 222/153.13, 222/321.1–321.3, 321.7–321.9, 383.3, 384, 222/385

See application file for complete search history.

(56) References Cited

U.S. PATENT DOCUMENTS

| | | | | |
|---|---|---|---|---|
| 3,237,571 | A * | 3/1966 | Corsette | 417/513 |
| 4,340,158 | A * | 7/1982 | Ford et al. | 222/153.13 |
| 4,524,888 | A * | 6/1985 | Tada | 222/153.02 |
| 5,401,148 | A * | 3/1995 | Foster et al. | 417/547 |
| 5,524,793 | A * | 6/1996 | O'Neill | 222/153.13 |
| 5,715,973 | A * | 2/1998 | Foster et al. | 222/153.13 |
| 5,738,250 | A * | 4/1998 | Gillingham et al. | 222/153.13 |
| 6,230,942 | B1 | 5/2001 | Kuo | |
| 6,283,332 | B1 * | 9/2001 | Ragno | 222/153.13 |
| 6,357,629 | B1 | 3/2002 | Ding | |
| 2004/0062667 | A1 | 4/2004 | Ding | |

FOREIGN PATENT DOCUMENTS

| | | | |
|---|---|---|---|
| CN | 2314128 | Y | 4/1999 |
| CN | 2483350 | Y | 3/2002 |
| JP | 8-84944 | A | 4/1996 |

(Continued)

OTHER PUBLICATIONS

International Search Report of PCT/CN2007/00429, dated Nov. 22, 2007.

*Primary Examiner* — Kevin P Shaver
*Assistant Examiner* — Nicholas J Weiss
(74) *Attorney, Agent, or Firm* — Hamre, Schumann, Mueller & Larson, P.C.

(57) ABSTRACT

The invention provides a water-ingress-preventing mechanism for a lotion pump. The mechanism is mainly used for a lotion pump mounted on a container with a liquid therein and is able to effectively prevent foreign liquids from entering the container. According to one aspect of the invention, in the locking tube portion (13) of the press head (10) is formed at least one longitudinal slot (15) which extends upwards from the lower end edge of the locking tube portion over at least part of the length of the locking tube portion. The slot is disposed such that the upper end of the slot is at a position above the top surface (25) of the cylinder cover (20) when the press head is pressed down to and at the lower stop position of its press stroke with respect to the cylinder cover. According to another aspect of the invention, the external thread (14) on the locking tube portion extends helically upwards from the lower end edge of the locking tube portion, whereas the internal thread (26) in the central through-hole (21) in the cylinder cover extends helically downwards from the upper end edge of the central through-hole. The features in the both of the two aspects effectively prevent foreign liquids from being sucked into the container during operation of the lotion pump.

16 Claims, 4 Drawing Sheets

FOREIGN PATENT DOCUMENTS

| | | | |
|---|---|---|---|
| JP | 9-226811 | A | 9/1997 |
| JP | 10-277443 | | 10/1998 |
| JP | 11-130119 | A | 5/1999 |
| JP | 3068248 | | 2/2000 |
| KR | 10-2001-21816 | | 3/2001 |
| WO | 99/03747 | | 1/1999 |

* cited by examiner

--Prior Art--

--Prior Art--

WATER-INGRESS-PREVENTING MECHANISM FOR LOTION PUMP

FIELD OF THE INVENTION

The present invention relates generally to the field of lotion pumps and, more particularly, to a water-ingress-preventing mechanism for a lotion pump.

BACKGROUND ART

A manual lotion pump is generally mounted on the mouth of a container with a lotion product contained therein. By pressing the pump, a user can get some liquid, such as a lotion, pumped out of the container by the pump for a certain application. At present, there are many types of water-ingress-preventing mechanism for a lotion pump, which are used to prevent foreign liquids, such as water, from entering the container and contaminating the product in the container during the pump being operated. Those conventional water-ingress-preventing mechanisms, however, all have more or less problems that they are hardly capable of completely preventing foreign liquids from entering the lotion container.

For example, a water-ingress-preventing mechanism of a lotion pump is disclosed in China Patent CN2314128Y, as shown in FIGS. 6 and 7. That conventional water-ingress-preventing mechanism of a lotion pump is basically composed of a press head 110, a cylinder cover 120 and a connecting conduit 130. In the head 110, there is a passage 111, the lower opening of which is defined by a tube-like joint portion 112 which extends downwards vertically from the body of the press head 110. A locking tube portion 113 is formed around the joint portion 112. The upper portion of the outside wall of the locking tube portion 113 is formed with an external thread. The upper end 131 of the connecting conduit 130 is press-fitted into the joint portion 112 of the press head 110 so as to be secured to the head 110 and thereby to create a fluid communication between the connecting conduit 130 and the passage 111. In the cylinder cover 120, there is a central through-hole 121 for the connecting conduit 130 to pass. On the inside wall surface of the lower portion of the central through-hole 121 is provided with a guide sleeve 122 for preventing water ingress, which extends upwards vertically beyond the top surface of the cylinder cover 120. The inside surface of the water-ingress-preventing guide sleeve 122 is in a slide fit with the outside wall surface of the connecting conduit 130. Between the outside wall surface of the water-ingress-preventing guide sleeve 122 and the inside wall surface of the upper portion of the central through-hole 121 is formed an annular recess 124, in which the locking tube portion 113 is to be threaded. The inside wall surface of the central through-hole 121 facing to the outside wall surface of the guide sleeve 122 is formed with an internal thread, which can mate with the external thread on the locking tube portion 113 when the press head 110 is pressed so that the lower end of the locking tube portion 113 enters into the annular recess 124 and is turned, thereby locking the press head 110 relative to the cylinder cover 120.

In operation of a lotion pump with the above-mentioned water-ingress-preventing mechanism, the press head 110 is pressed from the upper stop position (USP) of a press stroke and downwards with respect to the cylinder cover 120 until the lower end edge of the locking tube portion 113 enters into the annular recess 124 between the inside wall surface of the central through-hole 121 of the cylinder cover 120 and the outside wall surface of the guide sleeve 122, and the lowermost turn of the external thread of the locking tube portion

113 is in contact with the uppermost turn of the internal thread of the central through-hole 121. The position in which the turns of threads are contacted with each other is the lower stop position (LSP) of the press stroke of the press head 110 relative to the cylinder cover 120. During a process that the press head 110 is pressed from the USP to the LSP, some liquid is pumped out of the container (not shown), and meanwhile, some atmosphere air is sucked into the container through the small clearance between the inside wall surface of the water preventing guide sleeve 122 and the outside wall surface of the connecting conduit 130 to compensate for the negative pressure due to the reduction of the liquid volume in the container. However, when the press head 110 is pressed to such an extent that the lower end of its locking tube portion 113 enters into the annular recess 124 of the cylinder cover 120, if there is some dirty water or other liquids deposited in the recess (it is generally an inevitable case in a moist place such as bathroom), the lower end of the locking tube portion 113 will dip into the deposited liquid so as to block the communication between the container inside and the atmosphere air. Thus, if the press head 110 is further pressed down, the deposited liquid will be sucked into the container and contaminate the product therein.

SUMMARY OF THE INVENTION

In view of the problems of the previous art, an object of the invention is to provide a water-ingress-preventing mechanism for a lotion pump, which is capable of effectively preventing foreign liquids from entering the container on which the lotion pump is mounted.

To implement the object above of the invention, in one aspect, the invention provides a water-ingress-preventing mechanism for a lotion pump, comprising: a press head, in which a passage is formed, an locking tube portion being formed around a lower end opening of the passage and vertically extending downwards from a body of the press head, an external thread being formed on an outside wall of the locking tube portion; a connecting conduit, an upper end of which is fixed to the lower end opening of the passage of the press head so as to communicate with the passage; and a cylinder cover, which has a central through-hole for the connecting conduit to pass, a water-ingress-preventing guide sleeve being provided on an inside wall surface of a lower portion of the central through-hole to vertically extend beyond a top surface of the cylinder cover, the fit between an inside wall surface of the water-ingress-preventing guide sleeve and an outside wall surface of the connecting conduit being a slide fit with a clearance therebetween, the clearance providing a fluid communication between an interior of a container on which the lotion pump is mounted and the atmosphere, an annular recess for the locking tube portion to thread in being formed between an outside wall surface of the water-ingress-preventing guide sleeve and an inside wall surface of an upper portion of the central through-hole, an internal thread being formed on an inside wall of the central through-hole opposite to the outside wall surface of the water-ingress-preventing guide sleeve, the internal thread being able to engage the external thread on the locking tube portion so as to lock the press head relative to the cylinder cover, wherein the press head has an upper stop position and a lower stop position of its press stroke with respect to the cylinder cover, the lower stop position of the press stroke being defined by a position at which a lower end of the external thread of the locking tube portion abuts against an upper end of the internal thread of the central through-hole during a press stroke of the press head, and wherein at least one longitudinal slot is formed in the locking tube portion, extending at least a part of a length of the locking tube portion from a lower end edge of the locking tube portion, and is disposed such that an upper end of the slot is at a position above the top surface of the cylinder cover when the press head is in its lower stop position relative to cylinder cover.

In the context of this description, the words “upper” and “lower” are taken with respect to the orientation in which a lotion pump is normally used (the longitudinal axis of the lotion pump is in the vertical direction).

With the present invention, because at least one longitudinal slot is formed in the locking tube portion to extend from the lower end edge of the locking tube portion upwards over at least part of the length of the locking tube portion, and the upper end of the slot is disposed such that the upper end of the slot is at a position above the top surface of the cylinder cover when the press head is pressed down to the lower stop position of its press stroke, the longitudinal slot in the locking tube portion can always maintain a direct communication between the interior of the container and the atmosphere, even if the press head is pressed to such an extent that the lower end of the locking tube portion of the press head dips into the deposited dirty water in the annular recess of the cylinder cover, whereby the water-ingress-preventing mechanism of the invention for a lotion pump can prevent the deposited water in the annular recess of the cylinder cover from being sucked into the container and contaminating the liquid product within the container. Moreover, as the slot starts from the lower end edge of the locking tube portion, the slot becomes an open area (not a close area such as a circular hole), which is contributive to prevent liquid adsorption due to surface tension and to protect the slot from being jammed by other solid foreign substances.

The above at least one slot can be only one, or two or more. Preferably, the slot is of an elongate shape, which is helpful to prevent the slot from being choked by liquids (particularly viscous liquids) due to surface tension and to protect the slot from being choked by foreign substances other than liquids. The slot may have a rectangular or trapezoid shape or some other irregular shapes. In addition, the slot may extend along the longitudinal axis of the locking tube portion (i.e., the longitudinal axis of the lotion pump) or in a slightly tilted direction with respect to the longitudinal axis.

Also, to achieve the object above, in another aspect, the invention provides a water-ingress-preventing mechanism for a lotion pump comprising: a press head, in which a passage is formed, an locking tube portion being formed around a lower end opening of the passage and vertically extending downwards from a body of the press head, an external thread being formed on an outside wall of the locking tube portion; a connecting conduit, an upper end of which is fixed to the lower end opening of the passage of the press head so as to communicate with the passage; and a cylinder cover, which has a central through-hole for the connecting conduit to pass, a water-ingress-preventing guide sleeve being provided on an inside wall surface of a lower portion of the central through-hole to vertically extend beyond a top surface of the cylinder cover, the fit between an inside wall surface of the water-ingress-preventing guide sleeve and an outside wall surface of the connecting conduit being a slide fit with a clearance therebetween, the clearance providing a fluid communication between an interior of a container on which the lotion pump is mounted and the atmosphere, an annular recess for the locking tube portion to thread in being formed between an outside wall surface of the water-ingress-preventing guide sleeve and an inside wall surface of an upper portion of the central through-hole, an internal thread being formed on an inside wall of the central through-hole opposite to the outside wall surface of the water-ingress-preventing guide sleeve, the internal thread being able to engage the external thread on the locking tube portion so as to lock the press head relative to the cylinder cover, wherein the press head has an upper stop position and a lower stop position of its press stroke with respect to the cylinder cover, the lower stop position of the press stroke being defined by a position at which a lower end of the external thread of the locking tube portion abuts against an upper end of the internal thread of the central through-hole during a press stroke of the press head, and wherein the external thread of the locking tube portion extends helically upwards from the lower end edge of the locking tube portion, and the internal thread of the central through-hole extends helically downwards from an upper end edge of the central through-hole, whereby the lower end edge of the locking tube portion can enter the annular recess of the cylinder cover only by turning the two with respect to each other, whereas when the press head is pressed down to its lower stop position with respect to the cylinder cover, the lower end edge of the locking tube portion only abuts against the upper end edge of the central through-hole of the cylinder cover but can not enter the annular recess.

With the present invention, as the external thread on the locking tube portion extends helically upwards from the lower end edge of the locking tube portion and the internal thread in the central through-hole extends helically downwards from the upper end edge of the central through-hole, the lower stop position of the press stroke of the press head is defined such that a press actuation will not make the lower end of the locking tube portion enter into or obviously enter into the central through-hole, i.e., the annular recess of the cylinder cover. Thus, even if there is liquid deposited in the annular recess of the cylinder cover, as the locking tube portion can hardly enter into the annular recess, the situation that the fluid communication between the interior and exterior of the container is blocked off by the deposited water in the annular recess of the cylinder cover will be avoided. Moreover, even in a worst case that the annular recess is full of deposited liquids and the locking tube portion goes a little into the annular recess due to some factors, such as the phase difference between the internal thread and external thread, since the upper end of the water-ingress-preventing guide sleeve is higher than the top surface of the cylinder cover, i.e., than the upper end edge of the central through-hole, the deposited liquids will be prevented from being sucked into the container.

The external thread on the locking tube portion and the mating internal thread in the central through-hole of the cylinder cover can each be a single-start or double-start even or multi-start thread.

The other features and advantages of the water-ingress-preventing mechanism for a lotion pump of the invention will become apparent from the following description of an exemplary embodiment with reference to the accompanying drawings.

BRIEF DESCRIPTION OF THE DRAWINGS

FIG. 4A-4D depict a press head of the water-ingress-preventing mechanism for a lotion pump according to the invention used in FIG. 1-3, wherein FIG. 4A is a side elevation view, FIG. 4B is a longitudinal sectional view taken along line B-B in FIG. 4A, FIG. 4C is bottom view, and FIG. 4D is a bottom perspective view;

DETAILED DESCRIPTION

Figure 3:
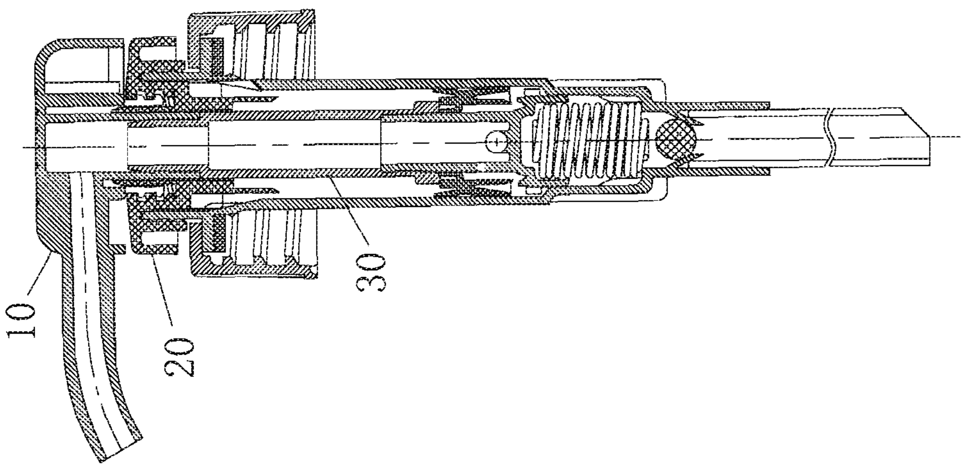
FIG. 3 is a longitudinal sectional view similar to FIG. 2, but with the press head locked relative to the cylinder cover.
Figure 2:
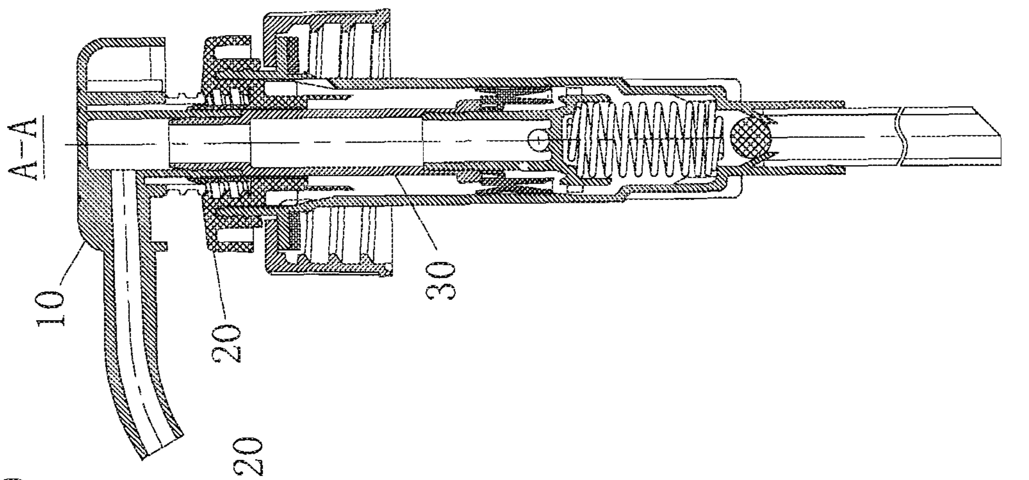
FIG. 2 is a longitudinal sectional view taken along line A-A in FIG. 1.
Figure 1:
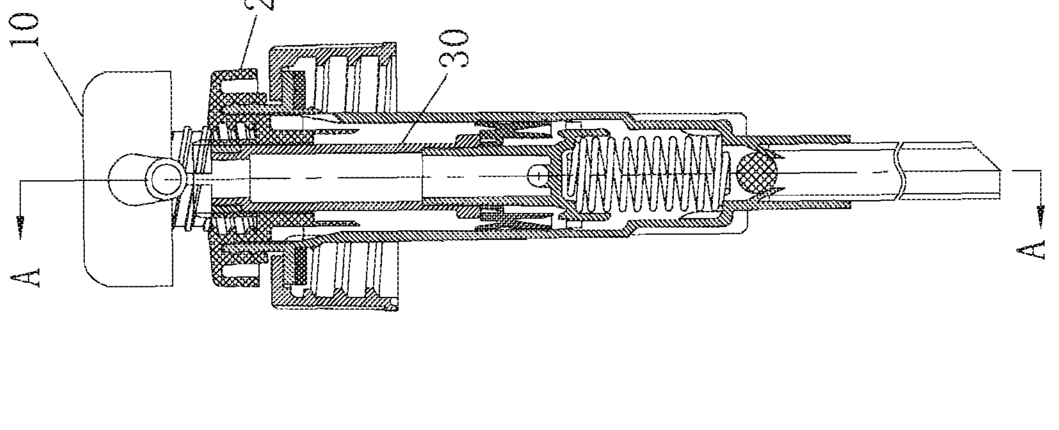
FIG. 1 is a partially sectioned, side elevation view of a lotion pump which has a water-ingress-preventing mechanism according to the invention, with the press head in the upper stop position of the press stroke with respect to the cylinder cover.
Figure 4B:
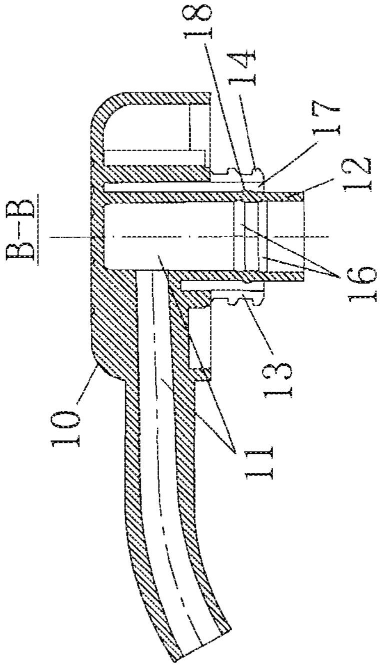
Figure 4D:
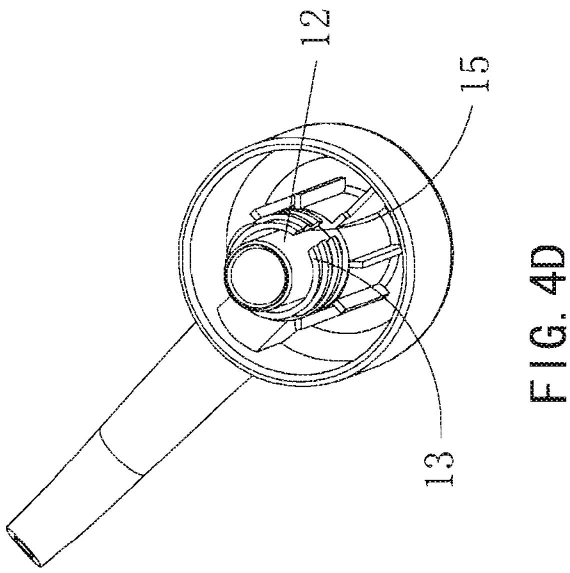
Figure 4A:
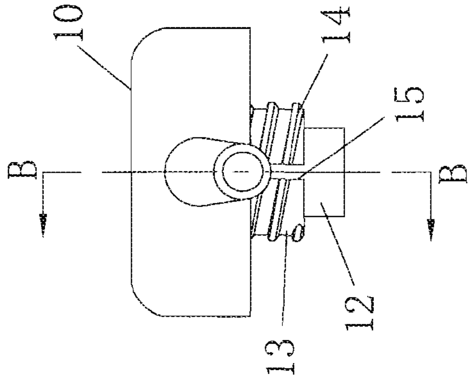
Figure 4C:
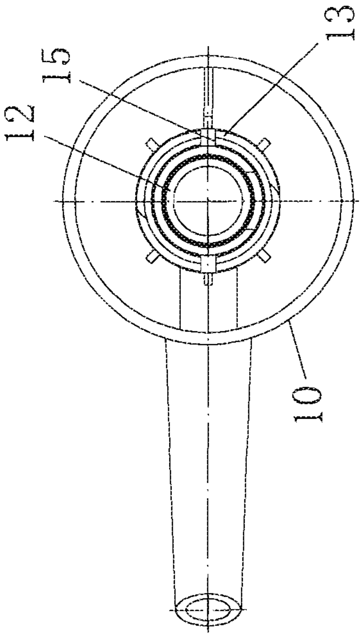

Referring to FIGS. 1-3, a water-ingress-preventing mechanism for a lotion pump according to the invention is incorporated in a conventional lotion pump, which is mounted on the mouth of a container (not shown) for pumping and distributing a liquid product out of the container. The water-ingress-preventing mechanism for a lotion pump generally comprises a press head 10, a connecting conduit 30 fixedly connected to the lower portion of the press head 10, and a cylinder cover 20 having a central through-hole for the connecting conduit 30 to pass. The press head 10, the connecting conduit 30, and the cylinder cover 20, together with certain other components (as shown in the figures, their design and combination with the elements of the invention fall within the prior art), make up the lotion pump shown in FIGS. 1-3. The invention, however, relates to only the three elements, and therefore the components of prior art will not be described herein.

In FIGS. 1 and 2, the press head 10 is in the LSP of the press stroke with respect to the cylinder cover 20, and in FIG. 3, the press head 10 is interlocked with the cylinder cover 20.

Referring to FIGS. 4A-4D, in the press head 10, there is formed a passage 11, which comprises a substantially horizontally extending portion and a portion vertically extending downwards from the horizontally extending portion. The lower end opening of the vertical portion of the passage 11 is defined by a tube-like joint portion 12 vertically extending from the body of the press head 10. The press head 10 is also formed with a locking tube portion 13 around and coaxial with the tube-like joint portion 12. The common axis of the tube-like joint portion 12 and the locking tube portion 13 corresponds to the longitudinal axis of the lotion pump. On the inside wall surface of the tube-like joint portion 12, there is formed two horizontal annular grooves 16, which are adapted for fitting with the two annular ribs 33 (as will be described hereinafter) formed on the connecting conduit 30 such that the connecting conduit 30 can be fixedly secured to the tube-like joint portion 12. Between the tube-like joint portion 12 and the locking tube portion 13, there is formed an annular gap 17, which is for insertion of a water-ingress-preventing guide sleeve 22 on the cylinder cover 20 (as will be described hereinafter). On the outside wall surface of the tube-like joint portion 12 (or on the outside wall surface of the connecting conduit 30 or on the inside wall surface of the locking tube portion 13) is formed a horizontal annular rib 18. The annular rib 18 is so positioned on the tube-like joint portion 12 that when the lower end edge of the locking tube portion 13 reaches the level of the top surface of the cylinder cover 20 during the press head 10 being pressed downwards, the annular rib 18 has already been diametrically engaged with the upper end portion of the water-ingress-preventing guide sleeve 22 thereby to create a sealing so that the fluid communication between the interior and the exterior of the container is blocked off.

In the locking tube portion 13 are formed two longitudinal slots 15 extending almost the whole length of the locking tube portion 13. The slots 15 are shaped substantially in an elongated rectangle and are diametrically opposite to each other. On the outside wall of the locking tube portion 13 is formed an external thread 14, which extends helically from the lower end edge of the locking tube portion 13 over the whole outside wall of the locking tube portion 13.

Figure 5:
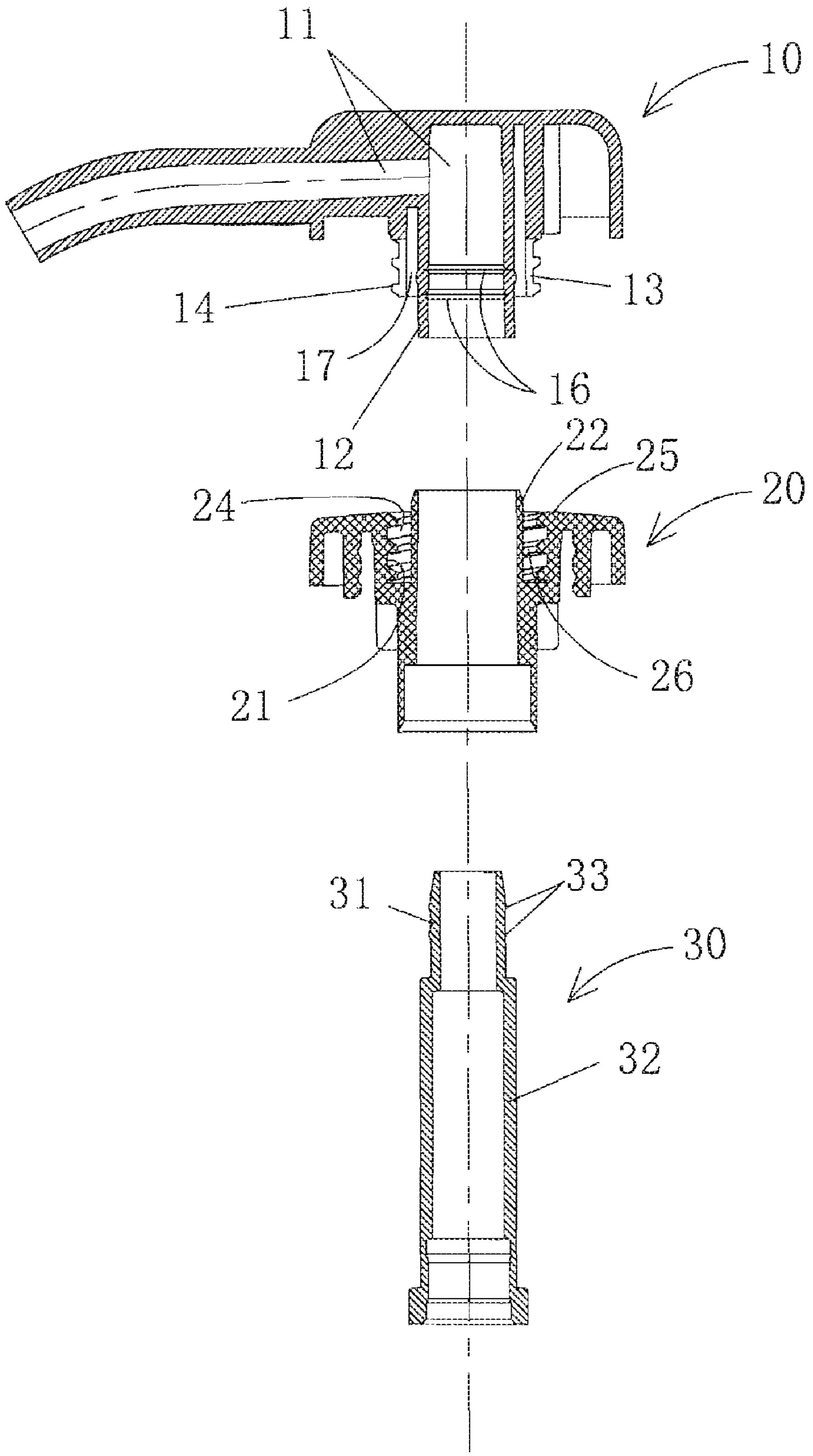
FIG. 5 is an exploded longitudinal sectional view of the water-ingress-preventing mechanism for a lotion pump according to the invention shown in FIG. 1.
Figure 6:
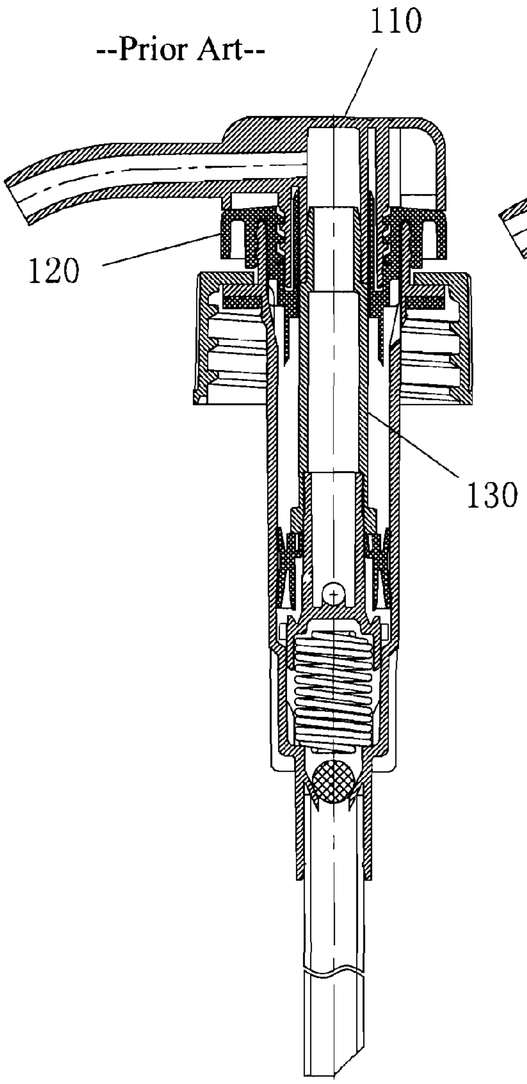
FIG. 6 is a longitudinal sectional view of a water-ingress-preventing mechanism for a lotion pump of the prior art.
Figure 7:
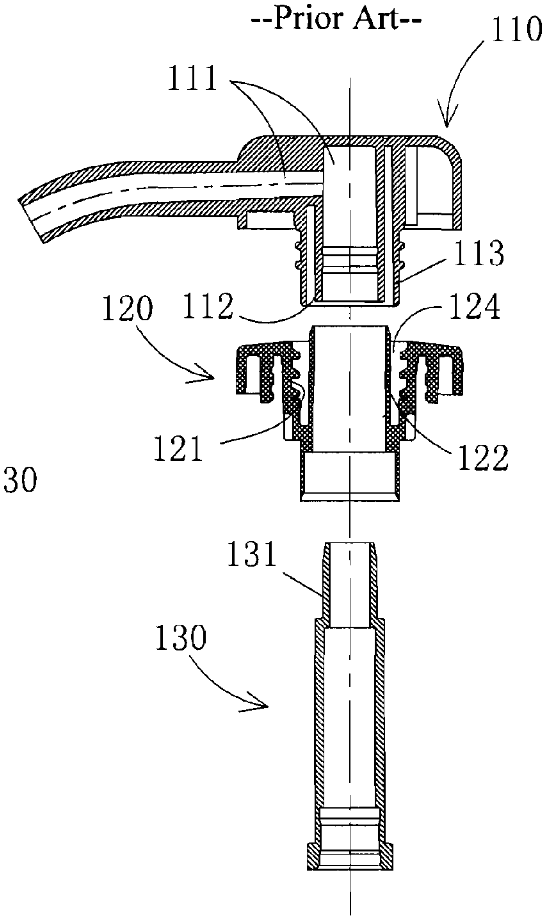
FIG. 7 is an exploded longitudinal sectional view of the water-ingress-preventing mechanism of a lotion pump of the prior art shown in FIG. 6.

Referring to FIG. 5, the connecting conduit 30 includes a body portion 32 and an upper end portion 31 with a reduced diameter. The upper end portion 31 can be press-fitted coaxially in the tube-like joint portion 12 of the press head 10. On the outside wall surface of the upper end of the connecting conduit 30 are formed two annular ribs 33. When the upper end portion 31 is inserted in the tube-like joint portion 12, the annular ribs 33 are engaged in the annular grooves 16 on the inside wall surface of the tube-like joint portion 12 so as to make the connecting conduit 30 be secured to the tube-like joint portion 12, i.e., to the press head 10, and to make the interior of the connecting conduit 30 communicate with the passage 11 in the press head 10. The outside diameter of the body portion 32 is the same as that of the tube-like joint portion 12, and therefore the connection of the connecting conduit 30 with the tube-like joint portion 12 forms a continuous outside surface.

The cylinder cover 20 has a central through-hole 21 through which the connecting conduit 30 passes. On the inside wall surface of the lower portion of the central through-hole 21 is integrally provided a water-ingress-preventing guide sleeve 22 which extends vertically upwards and beyond the top surface of the cylinder cover 20, i.e., the upper end edge of the central through-hole 21. The fit between the inside wall surface of the water-ingress-preventing guide sleeve 22 and the continuous outside surface constituted by the body portion 32 and the tube-like joint portion 12 is a slide fit with a little clearance therebetween. The clearance provides an air communication passage between the interior of the container and the atmosphere. When the press head 10 is pressed down to such an extent that the lower end edge of the locking tube portion 13 reaches the level of the top surface 25 of the cylinder cover 20 (i.e., the upper end edge of the central through-hole 21), namely at the moment the water-ingress-preventing guide sleeve 22 is just initially inserted into the annular gap 17 between the tube-like joint portion 12 and the locking tube portion 13, the inside wall surface of the upper end portion of the water-ingress-preventing guide sleeve 22 has already been in a diametrical close contact with annular rib 18 and thereby providing a sealing so as to block off the above air communication passage.

Between the outside wall surface of the water-ingress-preventing guide sleeve 22 and the inside wall surface of the upper portion of the central through-hole 21 is formed an annular recess 24, into which the locking tube portion 13 of the press head 10 can be threaded. An internal thread 26 is provided on the inside wall of the central through-hole 21, which is facing to the outside wall surface of the water-ingress-preventing guide sleeve 22. When the press head 10 is pressed downwards such that the lower end of the locking tube portion 13 enters the annular recess 24, and then is turned, the internal thread 26 can engage the external thread 14 on the locking tube portion 13 so as to interlock the press head 10 and the cylinder cover 20 together. The internal thread 26 extends helically from the upper end edge of the central through-hole 21 all the way to approach the bottom of the annular recess 24 so that the locking tube portion 13 can be threaded wholly in the annular recess 24. The radial dimension of the annular recess 24 is substantially the same as the thickness of the locking tube portion 13. Thus, the inside wall surface of the locking tube portion 13 is in contact with the outside wall surface of the water-ingress-preventing guide sleeve 22 when the external thread 14 on the locking tube portion 13 is engaged with the internal thread 26 in the central through-hole 21 of the cylinder cover. This can make the locking tube portion 13 be locked in the annular recess 24 more stably to avoid slippage that may occur due to a clearance.

The external thread 14 on the locking tube portion 13 and the internal thread 26 in the central through-hole 21 are both a double-start thread. Such a thread is contributive to a more stable abutment between the teeth of the external thread on the locking tube portion and the teeth of the internal thread of the cylinder cover. In particular, as the double-start thread has two thread heads which usually have a phase difference of 180 degrees, a close tooth abutment in diametrically opposite positions can be provided and thus the potentiality that the locking tube portion 13 enters a little into the annular recess 24 due to a phase difference between the two thread heads can be reduced. Further, the locking tube portion 13 can be prevented from becoming skew due to the pressing force and thus an associated jam of the threads of the locking tube portion 13, which is undesirable, can be avoided.

Now, the operation of the water-ingress-preventing mechanism for a lotion pump of the invention is described in detail with reference to the accompanying drawings.

When the press head 10 is pressed downwards to the position shown in FIGS. 1 and 2, the lower end edge of the locking tube portion 13 abuts against the upper end edge of the central through-hole 21 of the cylinder cover 20. At this time, because the external thread on the locking tube portion 13 extends from its lower end edge upwards and the internal thread 26 in the central through-hole 21 extends from its upper end edge downwards, the thread of the locking tube portion 13 and the thread of the central through-hole 21 are engaged with each other so as to prevent the locking tube portion 13 from entering the annular recess 24, and the position of the press head 10 at this moment is the LSP of the press head 10 with respect to the cylinder cover 20. Thus, even if there is deposited dirty water in the annular recess 24, because the press head 10 cannot go down any more, it will not occur that the dirty water is sucked into the container due to a further pressing on the press head 10. Moreover, because there is the additional annular rib 18 on the outside wall surface of the tube-like joint portion 12, when the lower end edge of the locking tube portion 13 is pressed downwards to the level of the top surface 25 of the cylinder cover 20, the annular rib 18 has been engaged with the inside wall surface of the upper end portion of the water-ingress-preventing guide sleeve 22 so as to create a sealing therebetween. Therefore, even in a worst case that the annular recess 24 is full of deposited liquid and the locking tube portion 13 goes a little into the annular recess 24 due to the phase difference between the internal and external threads of the central through-hole 21 and the locking tube portion 13, the sealing created by the annular rib 18 and the inside wall surface of the upper end portion of the water-ingress-preventing guide sleeve 22 can prevent the deposited liquid from being sucked into the container.

If an user attempts to move the press head 10 further downwards with respect to the cylinder cover 20 when the press head 10 has been in its LSP with respect to the cylinder cover 20, the only way available is to turn the press head 10 with respect to the cylinder cover 20 so as to make the external thread 14 on the locking tube portion 13 and the internal thread 26 in the central through-hole 21 of the cylinder cover 20 engage with each other, that is, to thread the locking tube portion 13 in the annular recess 24 of the cylinder cover 20. During the threading, the annular rib 18 on the tube-like joint portion 12 is always in a close engagement with the inside wall surface of the water-ingress-preventing guide sleeve 22 of the cylinder cover 20 until the external thread 14 on the locking tube portion 13 fully engages the internal thread 26 in the central through-hole 21 (the locked position shown in FIG. 3) so as to block off the air communication passage. That is to say, from the LSP of a press stroke all the way to the locked position, the annular rib 18 on the tube-like joint portion 12 is always kept in engagement with the inside wall surface of the water-ingress-preventing guide sleeve 22 so as to be able to prevent foreign substances (including the deposited liquids in the annular recess 24) from entering the container during the locking tube portion 13 being threaded into the annular recess 24. When the external thread 14 and the internal thread 26 are fully engaged with each other, the press head 10 is in a locked position relative to the cylinder cover 20, as shown in FIG. 3. This locked position is used generally in storage and transportation of the product.

In addition, as the longitudinal slots 15 are provided on the locking tube portion 13 and extends the whole length thereof, even if the locking tube portion 13 of the press head 10 dips into the deposited liquids in the annular recess 24 of the cylinder cover 20, the longitudinal slots 15 can provide a passage for air communication between the interior of the container and the atmosphere. This allows atmosphere air to enter the container through the longitudinal slots 15 to compensate for the negative pressure in the container caused by the pump operation, thereby to prevent effectively the deposited liquids in the annular recess 24 from being sucked into the interior of the container and contaminating the product therein.

In the exemplary embodiment described above, partially for the sake of simplicity and clarity, the techniques of the two aspects of the invention are implemented in a single water-ingress-preventing mechanism for a lotion pump. However, it can be understood by those skilled in the art that the two techniques can be individually implemented to achieve the object of the invention. Of course, it can also be understood by those skilled in the art that the combination of the techniques in the two aspects of the invention will provide a more remarkable effect.

In addition, those skilled in the art can make various changes and modifications of the embodiment described above without departing from the scope of the invention. For example, in the embodiment described above, the longitudinal slots 15 are made such that they extend along the whole length of the locking tube portion 13. Nevertheless, they can be modified such that they extend from the lower end edge of the locking tube portion 13 over part of the length thereof, so long as the upper ends of the slots are positioned above the top surface 25 of the cylinder cover 20 when the press head 10 is in the LSP of the press stroke with respect to the cylinder cover 20. For example again, in the embodiment described above, the connecting conduit 30 is secured to the press head 10 by being fit into the tube-like joint portion 12 of the press head 10. Nevertheless, it may be modified such that the connecting conduit 30 is secured to the press head 10 by being fit over the tube-like joint portion 12, or that the connecting conduit 30 is fixed directly to the body of the press head 10 without use of a tube-like joint portion. In the case that the connecting conduit 30 is fixed to the press head 10 by being fit over the tube-like joint portion 12 or directly without using the tube-like joint portion 12, the annular rib 18 of course can be provided on the connecting conduit 30. For example still again, in the embodiment described above, the annular rib 18 is provided on the outside wall surface of the tube-like joint portion 12 so as to diametrically engage the inside wall surface of the water-ingress-preventing guide sleeve 22. Nevertheless, it may be modified such that the annular rib 18 is provided on the inside wall surface of the locking tube portion 13 so as to diametrically engage the outside wall surface of the water-ingress-preventing guide sleeve 22. Obviously, the modifications described above will not influence the implementation and achievement of object of the invention. Therefore, the scope of the present invention is not limited to the specific implementation described above, but rationally defined by the claims.

The invention claimed is:

1. A water-ingress-preventing mechanism for a lotion pump, comprising:

a press head, in which a passage is formed, a locking tube portion being formed around a lower end opening of the passage and vertically extending downwards from a body of the press head, an external thread being formed on an outside wall of the locking tube portion;

a connecting conduit, an upper end of which is fixed to the lower end opening of the passage of the press head so as to communicate with the passage; and a cylinder cover, which has a central through-hole for the connecting conduit to pass, a water-ingress-preventing guide sleeve being provided on an inside wall surface of a lower portion of the central through-hole to vertically extend beyond a top surface of the cylinder cover, the fit between an inside wall surface of the water-ingress-preventing guide sleeve and an outside wall surface of the connecting conduit being a slide fit with a clearance therebetween, the clearance providing a fluid communication between an interior of a container on which the lotion pump is mounted and the atmosphere, an annular recess for the locking tube portion to thread in being formed between an outside wall surface of the water-ingress-preventing guide sleeve and an inside wall surface of an upper portion of the central through-hole, an internal thread being formed on an inside wall of the central through-hole opposite to the outside wall surface of the water-ingress-preventing guide sleeve, the internal thread being able to engage the external thread on the locking tube portion so as to lock the press head relative to the cylinder cover, wherein the press head has an upper stop position and a lower stop position of a press stroke with respect to the cylinder cover, the lower stop position of the press stroke being defined by a position at which a lower end of the external thread of the locking tube portion abuts against an upper end of the internal thread of the central through-hole during a press stroke of the press head, and wherein at least one longitudinal slot is formed in the locking tube portion, extending at least a part of a length of the locking tube portion from a lower end edge of the locking tube portion, and is disposed such that an upper end of the slot is at a position above the top surface of the cylinder cover when the press head is in the lower stop position relative to cylinder cover.

2. The water-ingress-preventing mechanism for a lotion pump of claim 1, wherein the external thread of the locking tube portion extends helically upwards from the lower end edge of the locking tube portion, and the internal thread of the central through-hole extends helically downwards from an upper end edge of the central through-hole, whereby the lower end edge of the locking tube portion enters the annular recess of the cylinder cover only by turning the locking tube portion and the cylinder cover with respect to each other, whereas when the press head is pressed down to the lower stop position with respect to the cylinder cover, the lower end edge of the locking tube portion only abuts against the upper end edge of the central through-hole of the cylinder cover but does not enter the annular recess.

3. The water-ingress-preventing mechanism for a lotion pump of claim 1, wherein the lower end opening of the passage in the press head is formed by a tube-like joint portion extending downwards from the body of the press head, the connecting conduit is connected to the press head body by being inserted into or fitted over the tube-like joint portion so as to provide a continuous outside wall surface that forms a slide fit with the inside wall surface of the water-ingress-preventing guide sleeve, and the locking tube portion surrounds the tube-like joint portion to form therebetween an annular groove for the water-ingress-preventing guide sleeve to be inserted therein.

4. The water-ingress-preventing mechanism for a lotion pump of claim 3, wherein on the outside wall surface of the tube-like joint portion or the connecting conduit, or on an inside wall surface of the locking tube portion, is formed an annular rib, which is positioned such that when the lower end edge of the locking tube portion is pressed downwards to the level of the top surface of the cylinder cover, the annular rib has been diametrically engaged with the inside wall surface of an upper end portion of the water-ingress-preventing guide sleeve so as to create a sealing which blocks off fluid communication between the interior of the container and the atmosphere.

5. The water-ingress-preventing mechanism for a lotion pump of claim 1, wherein the thickness of both the locking tube portion and the water-ingress-preventing guide sleeve is made such that when the external thread on the outside wall of the locking tube portion is engaged with the internal thread of the central through-hole, an inside wall surface of the locking tube portion and the outside wall surface of the water-ingress-preventing guide sleeve are in contact with each other.

6. The water-ingress-preventing mechanism for a lotion pump of claim 1, wherein the at least one longitudinal slot extends over the whole length of the locking tube portion.

7. The water-ingress-preventing mechanism for a lotion pump of claim 1, wherein the water-ingress-preventing guide sleeve is formed integrally with the cylinder cover.

8. The water-ingress-preventing mechanism for a lotion pump of claim 2, wherein the internal thread and the external thread each are a multi-start thread.

9. A water-ingress-preventing mechanism for a lotion pump, comprising:

a press head, in which a passage is formed, a locking tube portion being formed around a lower end opening of the passage and vertically extending downwards from a body of the press head, an external thread being formed on an outside wall of the locking tube portion;

a connecting conduit, an upper end of which is fixed to the lower end opening of the passage of the press head so as to communicate with the passage; and a cylinder cover, which has a central through-hole for the connecting conduit to pass, a water-ingress-preventing guide sleeve being provided on an inside wall surface of a lower portion of the central through-hole to vertically extend beyond a top surface of the cylinder cover, the fit between an inside wall surface of the water-ingress-preventing guide sleeve and an outside wall surface of the connecting conduit being a slide fit with a clearance therebetween, the clearance providing a fluid communication between an interior of a container on which the lotion pump is mounted and the atmosphere, an annular recess for the locking tube portion to thread in being formed between an outside wall surface of the water-ingress-preventing guide sleeve and an inside wall surface of an upper portion of the central through-hole, an internal thread being formed on an inside wall of the central through-hole opposite to the outside wall surface of the water-ingress-preventing guide sleeve, the internal thread being able to engage the external thread on the locking tube portion so as to lock the press head relative to the cylinder cover, wherein the press head has an upper stop position and a lower stop position of a press stroke with respect to the cylinder cover, the lower stop position of the press stroke being defined by a position at which a lower end of the external thread of the locking tube portion abuts against an upper end of the internal thread of the central through-hole during the press stroke of the press head, wherein the external thread of the locking tube portion extends helically upwards from a lower end edge of the locking tube portion, and the internal thread of the central through-hole extends helically downwards from an upper end edge of the central through-hole, whereby the lower end edge of the locking tube portion enters the annular recess of the cylinder cover only by turning the locking tube portion and the cylinder cover with respect to each other, whereas when the press head is pressed down to the lower stop position with respect to the cylinder cover, the lower end edge of the locking tube portion only abuts against the upper end edge of the central through-hole of the cylinder cover but does not enter the annular recess, wherein the lower end opening of the passage in the press head is formed by a tube-like joint portion extending downwards from the body of the press head, the connecting conduit is connected to the press head body by being inserted into or fitted over the tube-like joint portion so as to provide a continuous outside wall surface that forms a slide fit with the inside wall surface of the water-ingress-preventing guide sleeve, and the locking tube portion surrounds the tube-like joint portion to form therebetween an annular groove for the water-ingress-preventing guide sleeve to be inserted therein, and wherein on the outside wall surface of the tube-like joint portion or the connecting conduit, or on an inside wall surface of the locking tube portion, is formed an annular rib, which is positioned such that when the lower end edge of the locking tube portion is pressed downwards to the level of the top surface of the cylinder cover, but does not enter the annular recess to lock the press head relative to the cylinder cover, the annular rib has been diametrically engaged with an upper end portion of the water-ingress-preventing guide sleeve so as to create a sealing which blocks off fluid communication between the interior of the container and the atmosphere, and wherein at least one longitudinal slot is formed in the locking tube portion, extending at least a part of a length of the locking tube portion from a lower end edge of the locking tube portion.

10. The water-ingress-preventing mechanism for a lotion pump of claim 9, wherein the at least one longitudinal slot extends over the whole length of the locking tube portion.

11. The water-ingress-preventing mechanism for a lotion pump of claim 9, wherein the thickness of both the locking tube portion and the water-ingress-preventing guide sleeve is made such that when the external thread of the outside wall of the locking tube portion is engaged with the internal thread of the central through-hole, an inside wall surface of the locking tube portion and the outside wall surface of the water-ingress-preventing guide sleeve are in contact with each other.

12. The water-ingress-preventing mechanism for a lotion pump of claim 9, wherein the water-ingress-preventing guide sleeve is formed integrally with the cylinder cover.

13. The water-ingress-preventing mechanism for a lotion pump of claim 9, wherein the internal thread and the external thread each are a multi-start thread.

14. A water-ingress-preventing mechanism for a lotion pump, comprising:

a press head, in which a passage is formed, a locking tube portion being formed around a lower end opening of the passage and vertically extending downwards from a body of the press head, an external thread being formed on an outside wall of the locking tube portion;

a connecting conduit, an upper end of which is fixed to the lower end opening of the passage of the press head so as to communicate with the passage; and a cylinder cover, which has a central through-hole for the connecting conduit to pass, a water-ingress-preventing guide sleeve being provided on an inside wall surface of a lower portion of the central through-hole to vertically extend beyond a top surface of the cylinder cover, the fit between an inside wall surface of the water-ingress-preventing guide sleeve and an outside wall surface of the connecting conduit being a slide fit with a clearance therebetween, the clearance providing a fluid communication between an interior of a container on which the lotion pump is mounted and the atmosphere, an annular recess for the locking tube portion to thread in being formed between an outside wall surface of the water-ingress-preventing guide sleeve and an inside wall surface of an upper portion of the central through-hole, an internal thread being formed on an inside wall of the central through-hole opposite to the outside wall surface of the water-ingress-preventing guide sleeve, the internal thread being able to engage the external thread on the locking tube portion so as to lock the press head relative to the cylinder cover, wherein the press head has an upper stop position and a lower stop position of a press stroke with respect to the cylinder cover, the lower stop position of the press stroke being defined by a position at which a lower end of the external thread of the locking tube portion abuts against an upper end of the internal thread of the central through-hole during the press stroke of the press head, wherein the external thread of the locking tube portion extends helically upwards from a lower end edge of the locking tube portion, and the internal thread of the central through-hole extends helically downwards from an upper end edge of the central through-hole, whereby the lower end edge of the locking tube portion enters the annular recess of the cylinder cover only by turning the locking tube portion and the cylinder cover with respect to each other, whereas when the press head is pressed down to the lower stop position with respect to the cylinder cover, the lower end edge of the locking tube portion only abuts against the upper end edge of the central through-hole of the cylinder cover but does not enter the annular recess, and wherein at least one longitudinal slot is formed in the locking tube portion, extending at least a part of a length of the locking tube portion from a lower end edge of the locking tube portion.

15. The water-ingress-preventing mechanism for a lotion pump of claim 14, wherein the at least one longitudinal slot extends over the whole length of the locking tube portion.

16. The water-ingress-preventing mechanism for a lotion pump of claim 9, wherein the annular rib is disposed on an outside wall surface of the tube-like joint portion for diametrically engaging with the inside wall surface of the upper end portion of the water-ingress-preventing guide sleeve.

* * * * *